United States Patent
Lapp

(10) Patent No.: US 7,671,761 B2
(45) Date of Patent: Mar. 2, 2010

(54) METHOD AND SYSTEM FOR CALCULATING ALTITUDE ABOVE RUNWAY FOR AN AIRCRAFT

(75) Inventor: Tiffany R. Lapp, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 298 days.

(21) Appl. No.: 11/955,296

(22) Filed: Dec. 12, 2007

(65) Prior Publication Data
US 2009/0153363 A1 Jun. 18, 2009

(51) Int. Cl.
*G01C 21/00* (2006.01)
(52) U.S. Cl. .................. 340/977; 340/951; 340/961; 340/963; 340/970; 340/973; 340/979; 701/16; 701/213; 701/214
(58) Field of Classification Search .............. 340/951, 340/961, 963, 970, 973, 977, 979; 701/16, 701/213, 214
See application file for complete search history.

(56) References Cited

U.S. PATENT DOCUMENTS

| 4,316,252 | A | * | 2/1982 | Cooper | 701/16 |
| 5,113,346 | A | | 5/1992 | Orgun et al. | 364/428 |
| 5,677,685 | A | * | 10/1997 | Coirier et al. | 340/979 |
| 6,711,479 | B1 | * | 3/2004 | Staggs | 701/16 |
| 2009/0048724 | A1 | * | 2/2009 | Caule | 701/16 |

* cited by examiner

*Primary Examiner*—Tai T Nguyen
(74) *Attorney, Agent, or Firm*—Hayes Soloway P.C.

(57) ABSTRACT

The system contains a receiver in communication with a programmable device. The receiver receives a first horizontal distance from the aircraft to a threshold of the runway, an angle of a glide path, and a threshold crossing height. The programmable device determines a projected ground distance from the aircraft to the threshold. The programmable device determines a projected ground distance from the threshold to a glide path intercept point. The programmable device determines a vertical value along the glide path relative to a projected ground distance between the aircraft and the glide path intercept point. The programmable device determines a synthetic altitude above runway for the aircraft.

20 Claims, 5 Drawing Sheets

METHOD AND SYSTEM FOR CALCULATING ALTITUDE ABOVE RUNWAY FOR AN AIRCRAFT

FIELD

The present disclosure is generally related to aircraft navigational systems, and more particularly is related to a method and system for calculating altitude above runway for an aircraft.

BACKGROUND

Substantial elements of air travel are automated or aided by various electronic systems. For instance, when an aircraft is landing, the pilot is engaged in a number of activities while approaching the runway. These activities may include adjusting flight speed, adjusting a position of the aircraft, extending and locking landing gear, and other activities. To the extent these systems are controlled, aided, or prompted by computerized electronic systems on the aircraft, the systems may rely on an altitude of the aircraft relative to the runway for controlling the timing of system actions. For instance, the aircraft may be set at one speed when 500 feet above the runway and at a second speed when 200 feet above the runway. An example of a method for automating landings based on aircraft altitude is disclosed in U.S. Pat. No. 5,113,346.

Presently, aircraft may utilize a radio altimeter or 'radio altitude' techniques for determining an altitude of the aircraft. Radio altitude techniques determine an altitude of the aircraft relative to the ground immediately beneath the aircraft by sending and receiving radio waves directed downward to the ground and measuring the delay or echo upon receipt of the reflected signals at the aircraft. However, since the altitude of the terrain before the runway may be uneven, or many have an upsloping or downsloping terrain, or otherwise not match the altitude of the runway preceding the runway, radio altitude information fed to the aircraft computerized systems for interpretation may not accurately reflect the altitude of the aircraft above the runway.

FIG. 1 is an illustration of a glidepath angle 10 of an aircraft approach for a runway 12. Horizontal dotted lines mark the altitude 500 ft. above 14 the runway 12 and 200 ft. above 16 the runway 12, as well as the nominal pre-runway terrain 18, which is level with the runway 12. A nominal stage 1 alignment trigger 20 shows the location relative to aircraft glidepath angle 10 where activities that should be initiated at 500 ft. would be initiated. However, because radio altitude system is measuring altitude relative to actual terrain 22, the activities that should be initiated at 500 ft may not be initiated until the actual stage 1 alignment trigger 24, more than 200 ft closer to the runway than desirable. Similar differences are shown between the nominal stage 2 alignment trigger 26 and the actual stage 2 alignment trigger 28. The inaccuracy of the radio altitude system can prevent timely execution of pre-landing activities and, further, leave insufficient time between initiation of stage 1 and stage 2 activities.

Moreover, an upsloping pre-runway such as found at the runway facilities in Albuquerque, N. Mex. airport, graphically illustrated in FIG. 1, may further delay the insertion of the initial stage and compresses the amount of time in the approach available for each of the stages to accomplish their required actions. To work properly, the two stage alignment requires enough time between the first stage of alignment and the second stage of alignment for the first stage of alignment to be completed before the second stage of alignment has been inserted.

SUMMARY

One or more embodiments of the present invention provide a system and method for determining an altitude of an aircraft relative to a runway. According to one embodiment, a system includes a receiver in communication with a programmable device. The receiver receives data representing horizontal distance from the aircraft to a runway threshold, an angle of a glide path, and a runway threshold crossing height. The programmable device determines a projected ground distance from the aircraft to the runway threshold, a projected ground distance from the threshold to a glide path intercept point, a first vertical value along the glide path relative to a projected ground distance between the aircraft and the glide path intercept point, and based on the foregoing determines a synthetic altitude above runway for the aircraft.

According to another embodiment, a method includes receiving information of a horizontal distance from the aircraft to a runway threshold, the surface of the runway defining a runway plane, determining a projected ground distance from the aircraft to the runway threshold, determining a projected ground distance from the threshold to a glide path intercept point, based on a projected aircraft glide path angle and a runway threshold crossing height, determining a vertical height along the glide path relative to a projected ground distance between the aircraft and the glide path intercept point, and determining a synthetic altitude of the aircraft above runway based on the current height of the aircraft and a predetermined vertical error or angular deviation component.

According to yet another embodiment, an article of manufacture includes computer program code embodied in computer-readable medium comprising instructions that when executed are used to compute a synthetic altitude above a runway, the method includes receiving horizontal distance information of the distance from an aircraft to a runway threshold associated with a runway, the surface of the runway defining a runway plane, determining a projected ground distance from the aircraft to the runway threshold, determining a distance from the runway threshold to a glide path intercept point based on a projected aircraft glide path angle and a threshold crossing height, determining a current height of the aircraft above the runway plane based on the projected ground distance and the distance from the runway threshold to a glide path intercept point, and determining an aircraft synthetic altitude above the runway plane based on the current height of the aircraft and a predetermined vertical error or angular deviation component.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings, wherein like numerals depict like elements, and wherein.

DETAILED DESCRIPTION

Figure 1:
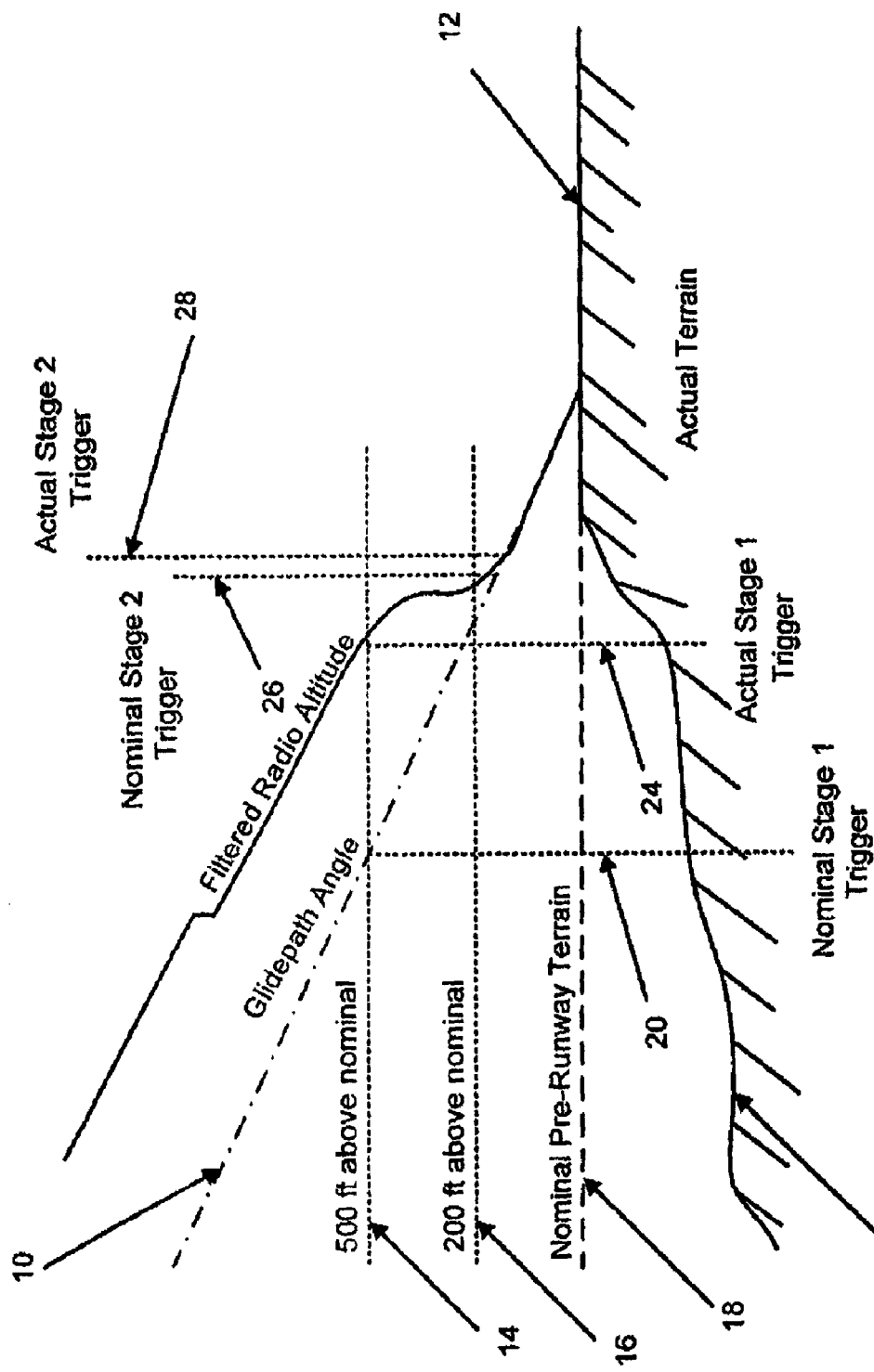
FIG. 1 is an illustration of a glidepath angle of an aircraft approach for a runway.
Figure 2:
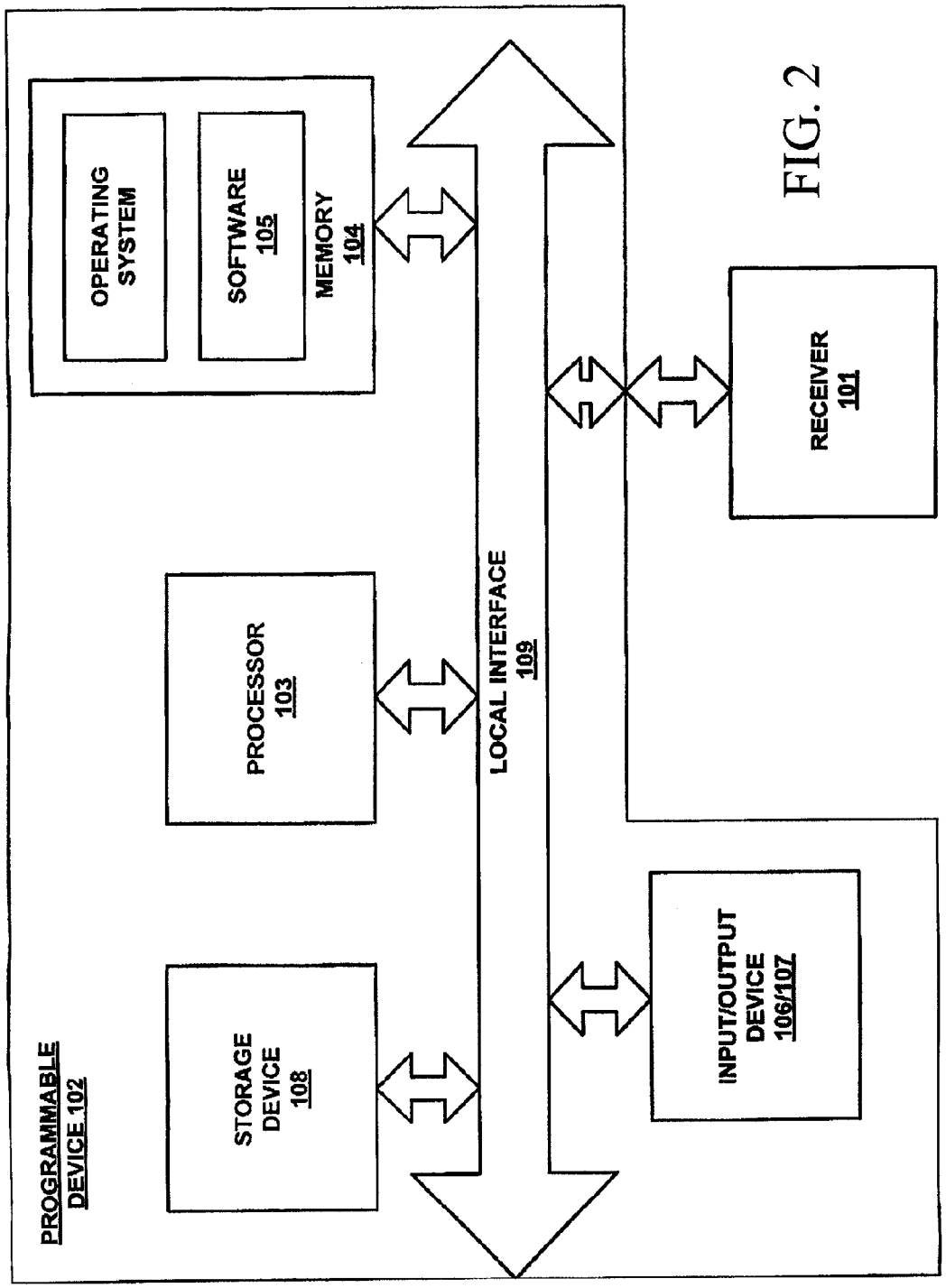
FIG. 2 is a block diagram of the system for determining an altitude of an aircraft relative to a runway, in accordance with a first exemplary embodiment of this disclosure.
Figure 3:
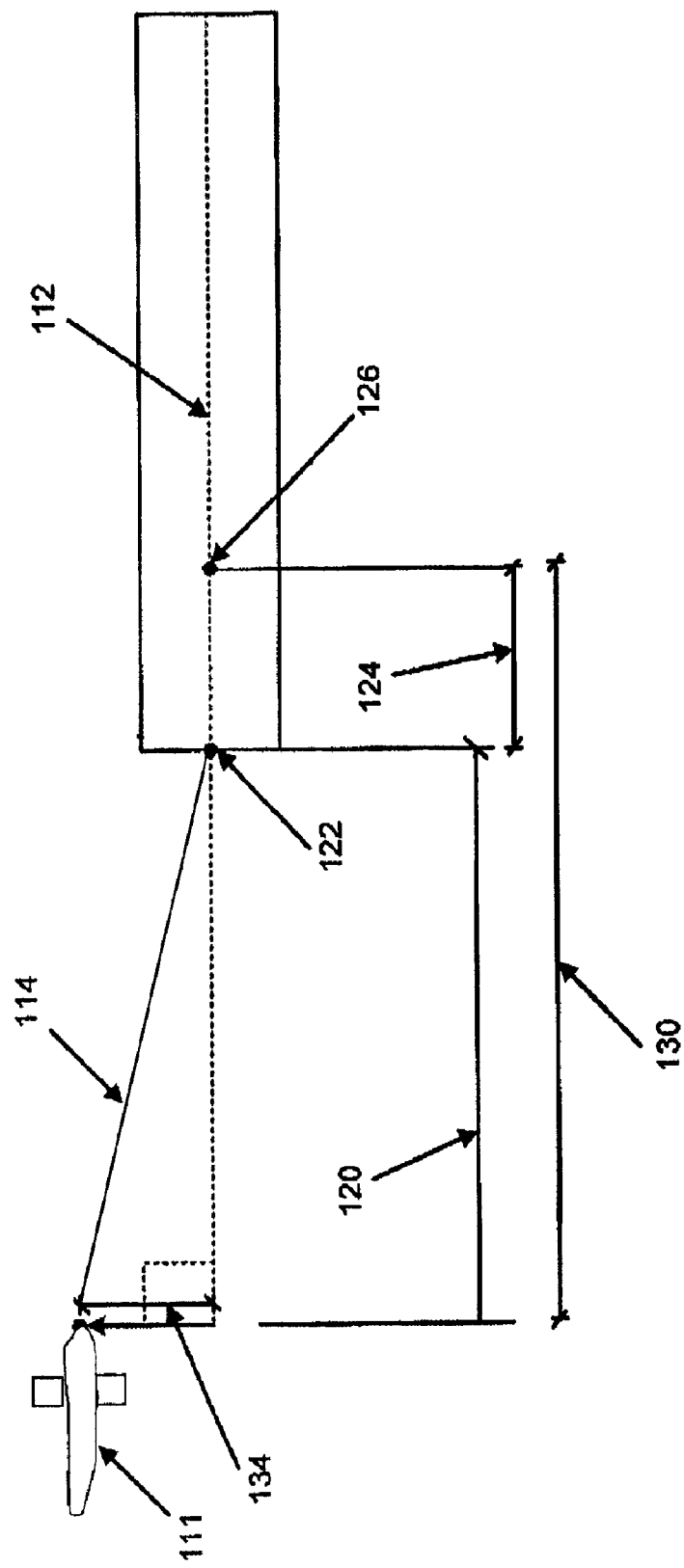
FIG. 3 is a planform view illustration of an aircraft approaching a runway, in accordance with the first exemplary embodiment of this disclosure.
Figure 4:
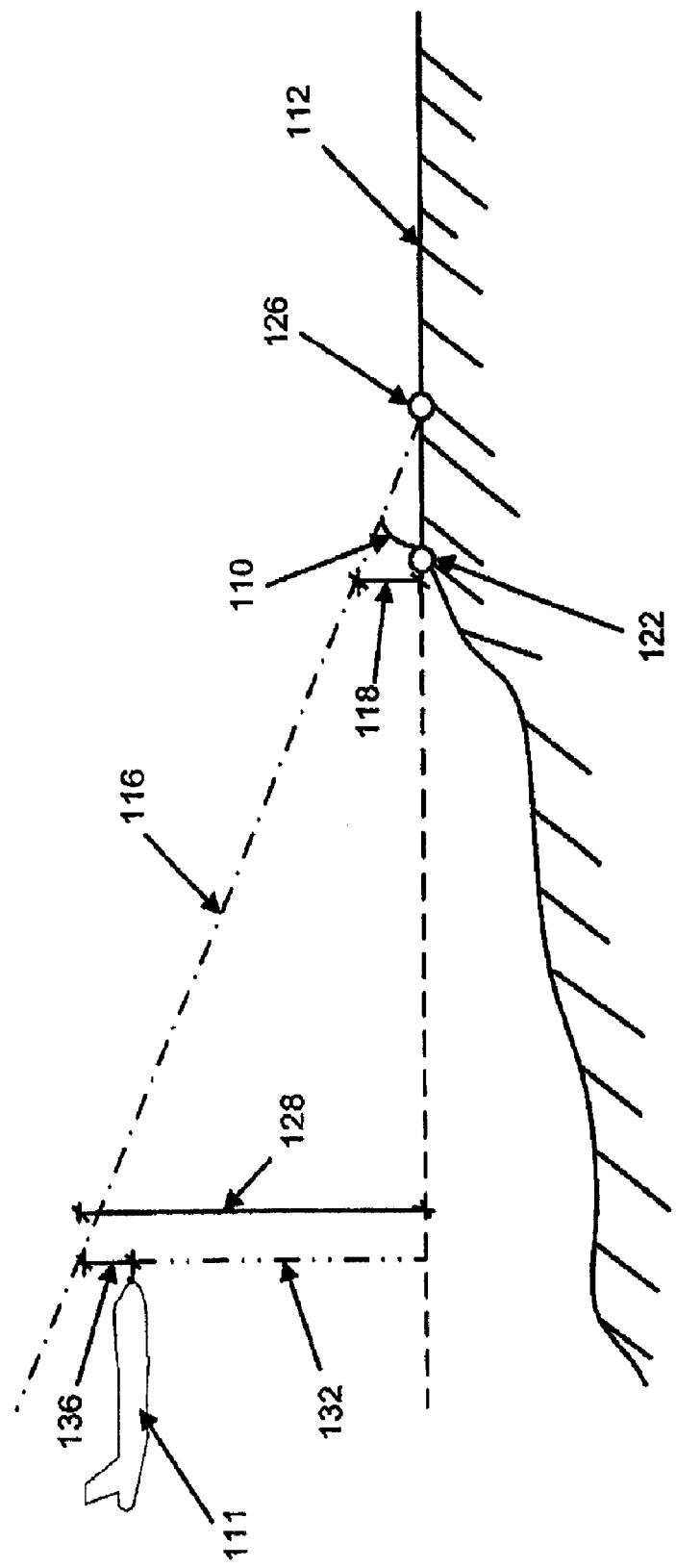
FIG. 4 is a side view illustration of an aircraft approaching a runway, in accordance with the first exemplary embodiment of this disclosure.

FIG. 2 is a block diagram of a system 100 for determining an altitude of an aircraft 111 relative to a runway 112, in accordance with a first exemplary embodiment of this disclosure. As used herein, the term exemplary indicates an example and not necessarily an ideal. FIG. 3 is an illustration of an aircraft 111 approaching a runway 112, in accordance with the first exemplary embodiment. And, FIG. 4 is another illustration of an aircraft 111 approaching a runway 112, in accordance with the first exemplary embodiment. The system 100 includes a receiver 101 in communication with a programmable device 102. The receiver 101 receives a first signal or data of angular distance 114 from the aircraft 111 to a threshold 122 of the runway 112, of an angle 110 of a glide path 116, and of a threshold crossing height 118. The programmable device 102 determines a first projected horizontal distance 120 from the aircraft 111 to the runway threshold 122. The programmable device 102 determines a second projected horizontal distance 124 from the runway threshold 122 to a glide path intercept point 126. The programmable device 102 determines a first vertical value 128 along the glide path 116 relative to a third projected horizontal distance 130 between the aircraft 111 and the glide path intercept point 126. Based on this data, the programmable device 102 then determines a synthetic altitude 132 above runway 112 for the aircraft 111.

A Global Navigation Landing System (GNSS Landing System) guidance may be a source for spatial data useful for the present disclosure. For example, the first horizontal distance 114 from the aircraft 111 to the threshold 122 of the runway 112 is spatial data that may be available through the GNSS Landing System. The first horizontal distance 114 from the aircraft 111 to the threshold 122 of the runway 112 may be a laterally projected slant distance between a Guidance Control Point on the aircraft 111 and a landing threshold point on the runway 112, as determined by the GNSS Landing System. The Guidance Control Point on the aircraft 111 may be set at the Instrument Landing System (ILS) Localizer/Glideslope receiver location.

The first horizontal distance 114 from the aircraft 111 to the threshold 122 of the runway 112 is spatial data that may be transmitted from the GNSS Landing System to the receiver 101 and is communicated from the receiver 101 to the programmable device 102. The receiver 101 may be, for example, a digital multi-mode receiver. The receiver 101 may also receive data regarding the angle 110 of the glide path 116, the threshold crossing height 118, and a vertical deviation 136 of the aircraft 111, and communicate that data to the programmable device 102.

Generally, in terms of hardware architecture, as shown in FIG. 2, the programmable device 102 includes a processor 103, a memory 104 capable of enabling execution of functions defined by software 105, one or more input devices 106 and output devices 107, or peripherals, and a storage device 108, that are communicatively coupled via a local interface 109. It should be noted that the storage device 108 may have numerous databases therein, as is described in detail below. The local interface 109 can be, but is not limited to, one or more buses or other wired or wireless connections, as are well known in the art. The local interface 109 may have additional elements, which are omitted for simplicity, such as controllers, buffers (caches), drivers, repeaters, and receivers, to enable communications. Further, the local interface 109 may include address, control, and/or data connections to enable appropriate communications among the aforementioned components.

The processor 103 is a hardware device for executing software, particularly the software 105 stored in the memory 104. The processor 103 can be any custom-made or commercially available processor, a central processing unit (CPU), an auxiliary processor among several processors associated with the programmable device 102, a semiconductor-based microprocessor (in the form of a microchip or chip set), a macroprocessor, or generally any device for executing software instructions.

The memory 104 can include any one or combination of volatile memory elements (e.g., random access memory (RAM, such as DRAM, SRAM, SDRAM, etc.)) and nonvolatile memory elements (e.g., ROM, hard drive, tape, CD-ROM, etc.). Moreover, the memory 104 may incorporate electronic, magnetic, optical, and/or other types of storage media. Note that the memory 104 can have a distributed architecture, where various components are situated remotely from one another, but can be accessed by the processor 103.

The software 105 may include one or more separate programs, each of which comprises an ordered listing of executable instructions for implementing logical functions. In the first exemplary embodiment of FIG. 2, the software 10 defines functionality performed by the programmable device 102 or an operating system. The operating system essentially controls the execution of other computer programs, such as the software 105 of the programmable device 102, and provides scheduling, input-output control, file and data management, memory management, and communication control and related services.

The software 105 of the programmable device 102 is a source program, executable program (object code), script, or any other entity comprising a set of instructions to be performed. The source program may be translated via a compiler, assembler, interpreter, or the like, which may or may not be included within the memory 104, so as to operate properly in connection with the operating system. Furthermore, the software 105 of the programmable device 102 can be written as (a) an object-oriented programming language, which has classes of data and methods, or (b) a procedure programming language, which has routines, subroutines, and/or functions.

The input devices 106 may include, for example, but not limited to, input from a GNSS Landing System, and input from sensors, e.g. altimeter, flap setting, body angle of attack, air and ground speed, etc., on the aircraft. The output devices 107 may include, for example, but not limited to, a display and warning devices, e.g. sound and light, or outputted to aircraft control devices. Finally, the input devices 106 and output devices 107 may further include devices that communicate as both inputs and outputs, for instance but not limited to, a modulator/demodulator (e.g., modem, for accessing another device, system, or network), a radio frequency (RF) or other transceiver, a voice or data interface, a bridge, a router, or a touchscreen.

When the programmable device 102 is in operation, the processor 103 is configured to execute the software 105 stored within the memory 104, to communicate data to and from the memory 104, and to generally control operations of the programmable device 102 under the control of the software 105. The programmable device 102 and the operating system, in whole or in part, but typically the latter, are read by the processor 103, generally buffered within the processor 103, and executed.

The programmable device 102 also contains the storage device 108 for storing the various databases described herein. It should be noted that, in accordance with alternative embodiments of the invention, certain databases may be located external from the storage device 108, where information stored within an external database is transferred to the programmable device 102 for use by the programmable device 102. The storage device 108 may be a computer readable medium that is removable, stationary, or stationary with a removable computer readable medium located therein. The storage device 108 may be an electronic, magnetic, optical, or other physical device or arrangement that can contain or a computer program, for use by or in connection with the programmable device 102.

In the context of this disclosure, a computer readable medium is an electronic, magnetic, optical, or other physical device or arrangement that can contain or store a computer program for use by or in connection with a computer-related system or method. The programmable device 102 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this disclosure, a "computer-readable medium" can be any arrangement that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples of the computer-readable medium would include, but are not limited to, the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and an optical disk such as a portable compact disc read-only memory (CD-ROM) (optical). The computer-readable medium also could be paper or another suitable medium upon which the program is printed, as the program can be electronically captured via, for instance, optical scanning of the paper or other medium, compiled, interpreted, or otherwise processed in a suitable manner if necessary, and stored in a computer memory.

Moreover, each of the functional components of the present disclosure may be embodied as one or more distributed computer program processes running on one or more conventional general-purpose computers networked together by conventional networking hardware and software. Each of these functional components may be embodied by running distributed computer program processes on networked computer systems (e.g., comprising mainframe and/or symmetrically or parallel computing systems) including appropriate mass storage, networking, and other hardware and software for permitting these functional components to achieve the stated function. These computer systems may be geographically distributed and connected together via appropriate wide and local-area network hardware and software. The communications media described herein (generally referred to using the generic term "network") may be a wired or wireless network, or a combination thereof.

Where the programmable device 102 is implemented in hardware only, the programmable device 102 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As can be understood by reviewing FIG. 3 and FIG. 4, the programmable device 102 utilizes known spatial values to calculate additional spatial values through various geometric relationships. Using the Pythagorean theorem, where the first projected horizontal distance 120 from the aircraft 111 to the runway threshold 122 is one leg of a right triangle, the lateral deviation 134 of the aircraft 111 is the other leg of the right triangle, and the first horizontal distance 114 from the aircraft 111 to the threshold 122 of the runway 112 is the hypotenuse, the first projected horizontal distance 120 is calculated. The second projected horizontal distance 124 from the runway threshold 122 to a glide path intercept point 126 by dividing the threshold crossing height 118 by the tangent of the glide path angle 110. The first projected horizontal distance 120 and the second projected horizontal distance 124 are summed to provide the third projected horizontal distance 130, which is the distance between the aircraft 111 and the glide path intercept point 126. The first vertical value 128 along the glide path 116 is then calculated as a product of the tangent of the glide path angle 110 and the third projected horizontal distance 130. The synthetic altitude 132 above runway 112 for the aircraft 111 is then calculated as the sum of the first vertical value 128 and a rectilinear vertical error 136 or angular deviation provided through the receiver 101.

The programmable device 102 and the receiver 101 may be mounted within the aircraft 111. The programmable device 102 may be used to aid landing the aircraft 111 utilizing the synthetic altitude 132 above runway 112. The programmable device 102 may be used to automate the landing of the aircraft 111 utilizing the synthetic altitude 132 above runway 112. The programmable device 102 may trigger one or more control law actions when the synthetic altitude 132 above runway 112 achieves a predetermined value.

The programmable device 102 may also be utilized to monitor a horizontal integrity limit. The accuracy of the first angular distance 114 from the aircraft 111 to the threshold 122 of the runway 112 may be compromised if the horizontal integrity limit surpasses the accuracy required for the altitude computation. As explained herein, the first horizontal distance 114 from the aircraft 111 to the threshold 122 of the runway 112 is an underpinning of the calculations of the present system 100. Thus, monitoring the horizontal integrity limit may be useful to alert a user of the system 100 that the output of the system 100 should not be relied upon. An output device 138, such as a computer screen monitor or a warning light, in communication with the programmable device 102, may be used to indicate to a user whether the horizontal integrity limit has been exceeded. Also, the process of determining the synthetic altitude 132 above runway 112 may be terminated when a predefined horizontal integrity limit has been exceeded.

The first exemplary embodiment describes one progression of calculations that may be utilized to arrive at the synthetic altitude 132 above runway 112. Other known geometric principles may be utilized to arrive at the same, or an equivalent, synthetic altitude 132 above runway 112. All such calculations utilizing the concepts disclosed herein to arrive at the same, or an equivalent, synthetic altitude 132 are considered to be within the scope of the present disclosure.

Figure 5:
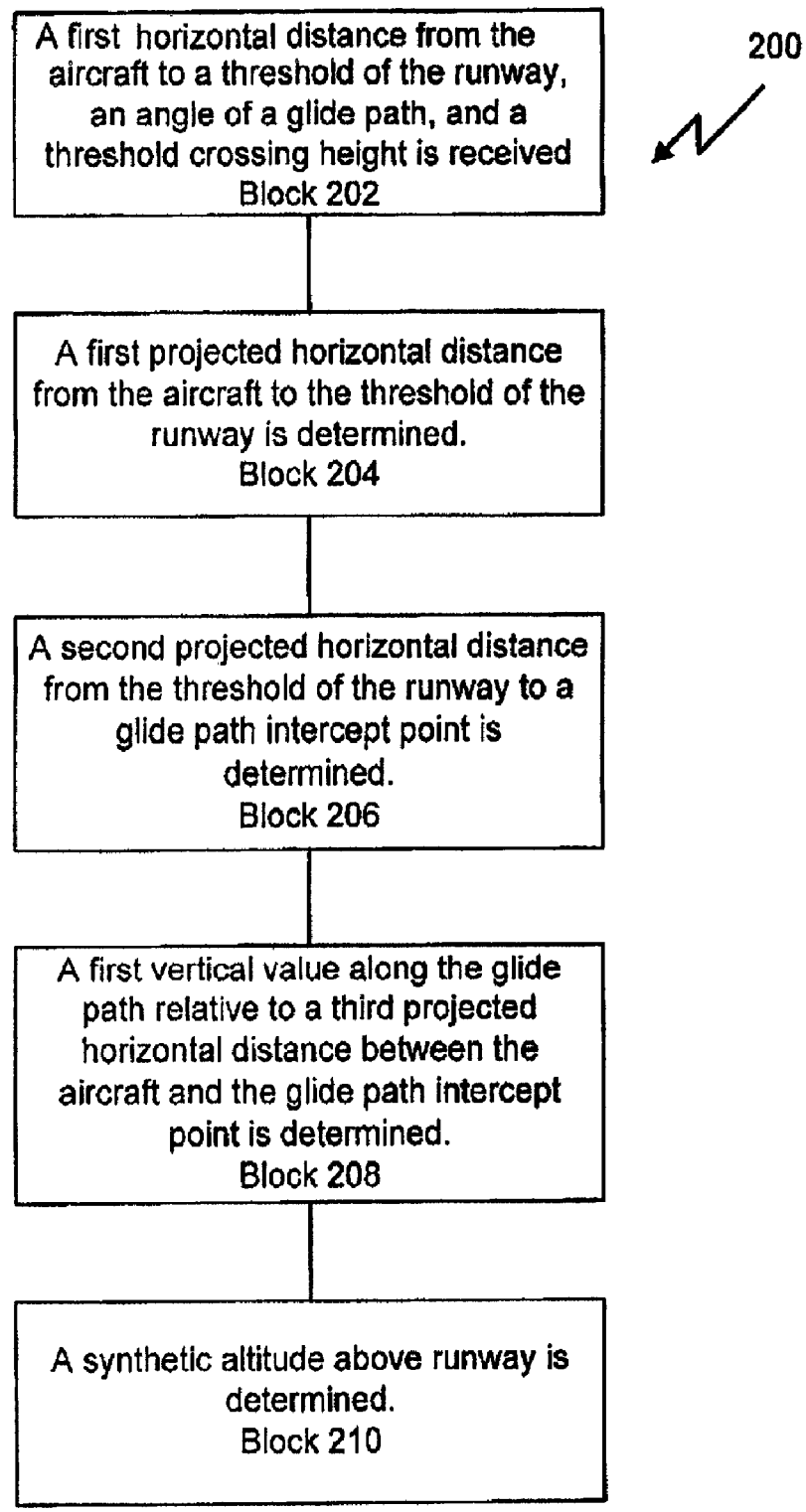
FIG. 5 is a flowchart illustrating a method for determining an altitude of an aircraft relative to a runway, in accordance with a first exemplary embodiment of this disclosure.

FIG. 5 is a flowchart 200 illustrating a method for determining an altitude of an aircraft relative to a runway, in accordance with an exemplary embodiment of this disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved.

As is shown by block 202, a first horizontal distance from the aircraft to a threshold of the runway, an angle of a glide path, and a threshold crossing height is received. A first projected horizontal distance from the aircraft to the threshold of the runway is determined (block 204). A second projected horizontal distance from the threshold of the runway to a glide path intercept point is determined (block 206). A first vertical value along the glide path relative to a third projected horizontal distance between the aircraft and the glide path intercept point is determined (block 208). A synthetic altitude above runway for the aircraft is determined (block 210).

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

What is claimed is:

1. A method for determining an altitude of an aircraft relative to a runway, the method comprising:
   receiving information of a horizontal distance from the aircraft to a runway threshold, associated with a runway, the surface of the runway defining a runway plane;
   determining a projected ground distance from the aircraft to the runway threshold;
   determining a projected ground distance from the runway threshold to a glide path intercept point, based on a projected aircraft glide path angle and a runway threshold crossing height;
   determining a vertical height along the glide path relative to a projected ground distance between the aircraft and the glide path intercept point; and
   determining a synthetic altitude of the aircraft above runway based on the current vertical height of the aircraft and a predetermined vertical error or angular deviation component.

2. The method of claim 1, further comprising utilizing the synthetic altitude as an input to a navigation control for the aircraft.

3. The method of claim 2, further comprising landing the aircraft using said navigation control.

4. The method of claim 1, further comprising triggering a control law action when the synthetic altitude above runway reaches a predetermined value.

5. The method of claim 4, wherein the control law action includes at least one of reconfiguring at least one control law, annunciating a flight level, and initiating a fault response.

6. The method of claim 4, further comprising monitoring a horizontal integrity limit, and initiating a control law action when the horizontal integrity limit has been exceeded.

7. The method of claim 4, wherein at least one of the control laws, warning detection, and fault response altitude triggers, are independent of at least one of terrain and aircraft altitude.

8. The method of claim 4, wherein the runway has an uneven, upsloping or downsloping pre-runway terrain, and including landing the aircraft under automatic control on said runway.

9. The method of claim 1, wherein the horizontal distance and vertical error information is provided to the aircraft by a satellite.

10. The method of claim 1, wherein the step of receiving horizontal distance information from the aircraft to the runway threshold further comprises determining a laterally projected slant distance between a Guidance Control Point on the aircraft and a landing threshold point on the runway.

11. The method of claim 1, including providing a library of runway characteristics selected from the group consisting of threshold crossing height, distance from the runway threshold to the glide path intercept point, and the glidepath angle, and retrieving one or more of said characteristics from said library.

12. A system for determining an altitude of an aircraft relative to a runway, the surface of the runway defining a runway plane, the system comprising:
    a receiver in communication with a programmable device, the receiver receiving data representing horizontal distance from the aircraft to a runway threshold, an angle of a glide path, and a runway threshold crossing height; and
    the programmable device determining a projected ground distance from the aircraft to the runway threshold, a projected ground distance from the threshold to a glide path intercept point, a vertical value along the glide path relative to a projected ground distance between the aircraft and the glide path intercept point, and based on the foregoing determines a synthetic altitude of the aircraft.

13. The system of claim 12, wherein the programmable device is mounted within the aircraft.

14. The system of claim 12, wherein the receiver is a digital multi-mode receiver.

15. The system of claim 12, wherein the horizontal distance from the aircraft to the runway threshold further comprises a laterally projected angular distance between a Guidance Control Point on the aircraft and a landing threshold point on the runway.

16. The system of claim 12, wherein the programmable device monitors a horizontal integrity limit; said system further comprising an output device indicating to a user whether the horizontal integrity limit has exceeded a predefined integrity requirement.

17. An article of manufacture comprising computer program code embodied in computer-readable medium comprising instructions that when executed are used to compute a synthetic altitude above a runway, the method comprising:
    receiving horizontal distance information of the distance from an aircraft to a runway threshold associated with a runway, the surface of the runway defining a runway plane;
    determining a projected ground distance from the aircraft to the runway threshold;
    determining a distance from the runway threshold to a glide path intercept point based on a projected aircraft glide path angle and a threshold crossing height;
    determining a current height of the aircraft above the runway plane based on the projected ground distance and the distance from the runway threshold to a glide path intercept point; and
    determining an aircraft synthetic altitude above the runway plane based on the current height of the aircraft and a predetermined vertical error or angular deviation component.

18. The article of manufacture of claim 17, wherein said computer-readable program code triggers a control law action when the synthetic altitude above runway reaches a predetermined value.

19. The article of manufacture of claim 17, wherein the computer-readable program code determines if a ground integrity limit has been exceeded.

20. The article of manufacture of claim 19, wherein the computer readable program code terminates determination of the synthetic altitude above runway for the aircraft when the ground integrity limit has exceeded a predetermined integrity requirement.

* * * * *